(12) United States Patent
Kong et al.

(10) Patent No.: US 10,281,645 B2
(45) Date of Patent: May 7, 2019

(54) LIQUID CRYSTAL DISPLAY DEVICE

(71) Applicant: LG DISPLAY CO., LTD., Seoul (KR)

(72) Inventors: Hyunsik Kong, Gumi-si (KR); Jingu Kim, Gumi-si (KR)

(73) Assignee: LG DISPLAY CO., LTD., Seoul (KR)

( * ) Notice: Subject to any disclaimer, the term of this patent is extended or adjusted under 35 U.S.C. 154(b) by 38 days.

(21) Appl. No.: 15/365,526

(22) Filed: Nov. 30, 2016

(65) Prior Publication Data
US 2017/0153386 A1    Jun. 1, 2017

(30) Foreign Application Priority Data
Nov. 30, 2015  (KR) .................. 10-2015-0169218

(51) Int. Cl.
*F21V 8/00*    (2006.01)

(52) U.S. Cl.
CPC .......... *G02B 6/0088* (2013.01); *G02B 6/009* (2013.01); *G02B 6/0056* (2013.01); *G02B 6/0068* (2013.01)

(58) Field of Classification Search
CPC .... G02B 6/0088; G02B 6/009; G02B 6/0068; G02B 6/0056
See application file for complete search history.

(56) References Cited

U.S. PATENT DOCUMENTS

| | | | | |
|---|---|---|---|---|
| 7,697,090 B2* | 4/2010 | Shimizu | ..................... | F21V 7/05 349/65 |
| 2005/0099555 A1* | 5/2005 | Kim | ..................... | G02B 6/0088 349/58 |
| 2010/0165234 A1* | 7/2010 | Park | ..................... | G02B 6/0088 349/58 |
| 2010/0259949 A1* | 10/2010 | Ye | ..................... | G02B 6/0055 362/607 |
| 2010/0277664 A1* | 11/2010 | Kim | ..................... | G02B 6/0085 349/58 |
| 2014/0071370 A1* | 3/2014 | Wang | ..................... | G02B 6/0088 349/58 |
| 2014/0092339 A1* | 4/2014 | Yoshimura | ........ | G02F 1/133308 349/58 |
| 2014/0307175 A1* | 10/2014 | Oka | ..................... | H04N 5/64 348/790 |
| 2015/0355404 A1* | 12/2015 | Lee | ..................... | G02B 6/0088 362/606 |
| 2016/0131827 A1* | 5/2016 | Lee | ..................... | G02B 6/0088 349/58 |
| 2016/0282549 A1* | 9/2016 | Masuda | ............... | G02B 6/0085 |

FOREIGN PATENT DOCUMENTS

| | | |
|---|---|---|
| KR | 10-2008-0049570 A | 6/2008 |
| KR | 10-2014-0025981 A | 3/2014 |

* cited by examiner

*Primary Examiner* — Kevin Quarterman
(74) *Attorney, Agent, or Firm* — Birch, Stewart, Kolasch & Birch, LLP

(57) ABSTRACT

Described is a liquid crystal display device including an edge light source array or a direct-type light source array and a group of optical sheets disposed over a light guide plate. The liquid crystal display device has at least one foot that extends towards the side of the bottom cover from one edge of a top sheet among the group of optical sheets. The at least one foot partially fixes the group of optical sheets to prevent movement in the vertical and horizontal directions in an upright display orientation, while allowing for expansion of the optical sheets during manufacturing.

14 Claims, 13 Drawing Sheets

LIQUID CRYSTAL DISPLAY DEVICE

CROSS-REFERENCE TO RELATED APPLICATION

Pursuant to 35 U.S.C. § 119(a), this application claims the benefit of an earlier filing date of and the right of priority to Application No. 10-2015-0169218, filed in the Republic of Korea on Nov. 30, 2015, the contents of which are incorporated by reference herein in their entirety.

BACKGROUND OF THE INVENTION

1. Field of the Invention

The present invention relates to a liquid crystal display device, and more particularly, to a liquid crystal display device that can suppress the movement of optical sheets by altering the structure of the sheets.

2. Description of the Conventional Art

Today, image displays have shifted from Braun tubes to liquid crystal displays, plasma display panels, etc. Especially, liquid crystal displays have attracted great attention as next-generation image displays because they have lower power consumption, are thinner and more lightweight, and emit much less undesirable electromagnetic radiation, compared to Braun tubes.

A liquid crystal display device comprises a lower substrate with TFTs (thin film transistors), an upper substrate with color filters arranged on it, and a liquid crystal layer injected between the lower substrate and the upper substrate.

The TFTs on the lower substrate serve to transmit and control electrical signals, and liquid crystals control the transmission of light by altering the molecular structure depending on an applied voltage. Light controlled by this process appears as an image of a desired color as it passes through the upper substrate.

Meanwhile, since the liquid crystal display device is a light receiving device that displays an image by adjusting the amount of light coming from the outside, it requires a separate light source, i.e., backlight assembly, for illuminating a liquid crystal panel.

The backlight assembly is roughly classified into an edge-lit backlight assembly and a direct-type backlight assembly depending on the position of the light source relative to a display surface. Especially, the edge-lit backlight assembly is widely used in large liquid crystal displays because it has high light utilization efficiency and is easy to handle and thin, with no limit on the size of the display surface.

A liquid crystal display device according to the related art which uses such an edge-lit backlight assembly will be described below with reference to FIGS. 1 to 5. The liquid crystal display device has a horizontal direction and a vertical direction when in an upright display orientation.

FIG. 1 is a top plan view schematically showing an optical sheet disposed on a light guide plate of a liquid crystal display device according to the related art.

FIG. 2 is a cross-sectional view taken along the line II-II of FIG. 1, which shows a combined cross-section of the liquid crystal display device according to the related art.

As shown in FIGS. 1 and 2, a liquid crystal display device according to the related art includes a liquid crystal panel 10 where an image is displayed, and a backlight unit 20 that is affixed to the liquid crystal panel 10 and provides light to the liquid crystal panel 10.

The liquid crystal panel 10 includes a color filter (CF) substrate 12, a thin film transistor substrate 14 provided under the color filter substrate 12, and a liquid crystal layer interposed between these substrates 12 and 14.

The backlight unit 20 includes a light guide plate 21, a light source array 23 disposed on one side of the light guide plate 21 and consisting of a plurality of light emitting elements 23a and an array substrate 23b, a group of optical sheets 22 disposed over the light guide plate 21, a reflective sheet 25 disposed under the light guide plate 21, a bottom cover 24 in which these components, i.e., the reflective sheet 25, the light guide plate 21, and the light source array 23, are contained, and a guide panel 26 that protects the bottom cover 24.

The liquid crystal panel 10 is seated and disposed on the guide panel 26.

The group of optical sheets 22 includes a diffusive sheet 22a that is stacked on the light guide plate 21 and diffuses light coming from the light guide plate 21, a plurality of prism sheets 22b that collect the light diffused by the diffusive sheet 22a and supply it uniformly across the entire area of the liquid crystal panel 10, and a top sheet implemented as a reflective polarizer 22c.

FIG. 3 is an enlarged top plan view of the portion A of FIG. 1, which schematically shows a gap G1 between the light source array and the group of optical sheets and a vertical gap G2 between the bottom cover and the group of optical sheets when viewed in an upright display orientation.

FIG. 4 is an enlarged top plan view of the portion B of FIG. 1, which schematically shows a horizontal gap G3 between the bottom cover and the group of optical sheets when viewed in an upright display orientation.

FIG. 5 is an enlarged cross-sectional view of the portion C of FIG. 2, which schematically shows the gap G1 between the light source array and the group of optical sheets.

As shown in FIGS. 3 and 4, a first gap G1 is formed between the group of optical sheets 22 and the light source array 23, and second and third gaps G2 and G3 are formed vertically and horizontally, respectively, between the bottom cover 24 and the group of optical sheets 22 when viewed in an upright display orientation.

As such, as shown in FIG. 5, the liquid crystal display device according to the related art has no structure for fixing the group of optical sheets 22 vertically and horizontally. Thus, when the liquid crystal display device is shaken by hand, noise occurs due to movement of the group of optical sheets.

In the liquid crystal display device according to the related art, it is necessary to make gaps in order to assemble different components, for example, the bottom cover, the light source array, and the group of optical sheets. Moreover, in a high-temperature reliability test, the group of optical sheets expand thermally, and this increases the size of the group of optical sheets, thus causing interference with other components and resulting in wrinkles in the group of optical sheets.

To prevent these wrinkles in the group of optical sheets, it is necessary to make certain gaps between the group of optical sheets and other components in horizontal and vertical directions from the perspective of an upright display orientation.

Although these gaps between the components may prevent wrinkles in the group of optical sheets when assembling the group of optical sheets, they cannot prevent noise caused by the movement of the group of optical sheets when the liquid crystal display device is shaken by hand.

Accordingly, the group of optical sheets used in the liquid crystal display device according to the related art has its structural limitation when it comes to preventing noise caused by the movement of the group of optical sheets when the liquid crystal display device is shaken by hand.

SUMMARY OF THE INVENTION

An aspect of the present invention is to provide a liquid crystal display device that, when the liquid crystal display device is shaken by hand, can minimize the movement of a group of optical sheets while allowing for expansion during manufacturing by altering the structure of the top sheet in the group of optical sheets.

Another aspect of the present invention is to provide a liquid crystal display device that can reduce noise from the group of sheets, which may occur when the liquid crystal display device is shaken by hand, by forming a fixing structure in the group of optical sheets to supplement the assembly structure of the group of optical sheets and other components.

To accomplish the above-mentioned aspects, the present invention provides a liquid crystal display device including: a liquid crystal panel; a light source array disposed under the liquid crystal panel; a light guide plate disposed corresponding to one side of the light source array; a group of optical sheets disposed over the light guide plate and having a foot that extends from one edge of the top sheet towards the side of the light guide plate; and a bottom cover in which the light source array, light guide plate, and group of optical sheets are contained.

In the liquid crystal display device according to the present invention, the foot may be disposed between light emitting elements of the light source array.

In the liquid crystal display device according to the present invention, a guide slot corresponding to the foot may be formed on one edge of intermediate and bottom sheets, among the group of optical sheets, underlying the top sheet.

In the liquid crystal display device according to the present invention, a light emitting element insertion hole may be formed so that a light emitting element is fitted to the foot of the top sheet in the group of optical sheets.

In the liquid crystal display device according to the present invention, at least one foot may be formed on one edge of the top sheet.

In the liquid crystal display device according to the present invention, a foot rack with a foot insertion hole may be formed on one edge of the intermediate and bottom sheets in the group of optical sheets so that the foot of the top sheet is inserted through the foot insertion hole.

In the liquid crystal display device according to the present invention, a guide slot may be formed on one edge of the light guide slot so that the foot of the top sheet is disposed in a bent position.

In the liquid crystal display device according to the present invention, the guide slot on one edge of the light guide plate may be formed on the side of the light guide plate, opposite the light source array.

A liquid crystal display device according to the present invention can reduce noise from sheets, which may occur when the liquid crystal display device is shaken by hand, by forming a foot on the top sheet, among a plurality of optical sheets disposed over the light guide plate, and half-fixing the foot on the top sheet between light emitting elements and between the light guide plate and the bottom cover.

Moreover, the liquid crystal display device according to the present invention can prevent wrinkles in the sheets by forming a foot on the top sheet, among a plurality of optical sheets disposed over the light guide plate, half-fixing the part of the top sheet where the foot is formed, when assembling a backlight unit, and keeping an assembly gap between the part of the top sheet where no foot is formed and other components.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE EMBODIMENTS

Figure 1:
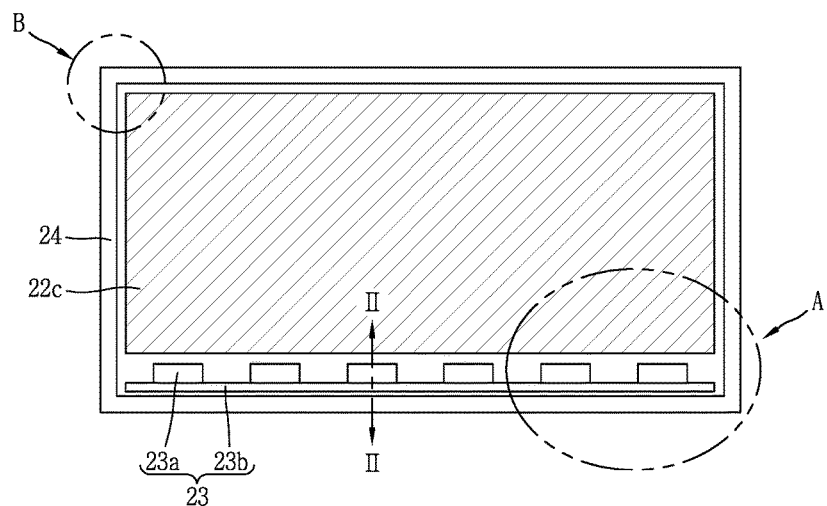
FIG. 1 is a top plan view schematically showing a group of optical sheets disposed over a light guide plate of a liquid crystal display device according to the related art.

Hereinafter, embodiments of the present invention will be described with reference to the accompanying drawings. In the following description, the same elements will be designated by the same reference numerals although they are shown in different drawings. Further, in the following description, a detailed description of known functions and configurations incorporated herein will be omitted when it may make the subject matter of the present invention unclear.

In addition, terms, such as first, second, A, B, (a), (b) or the like, may be used herein when describing components of the present invention. Each of these terminologies is not used to define an essence, order, or sequence of a corresponding component but used merely to distinguish the corresponding component from other component(s). It should be noted that if it is described in the specification that one component is "connected," "affixed," or "attached" to another component, a third component may be "interposed" between the first and second components, although the first component may be directly "connected," "affixed," or "attached" to the second component. In the same context, it shall be understood that, when it is described that any component is formed "on", "over", or "under" another component, the former may be formed on the latter directly or indirectly through a third component.

Figure 6:
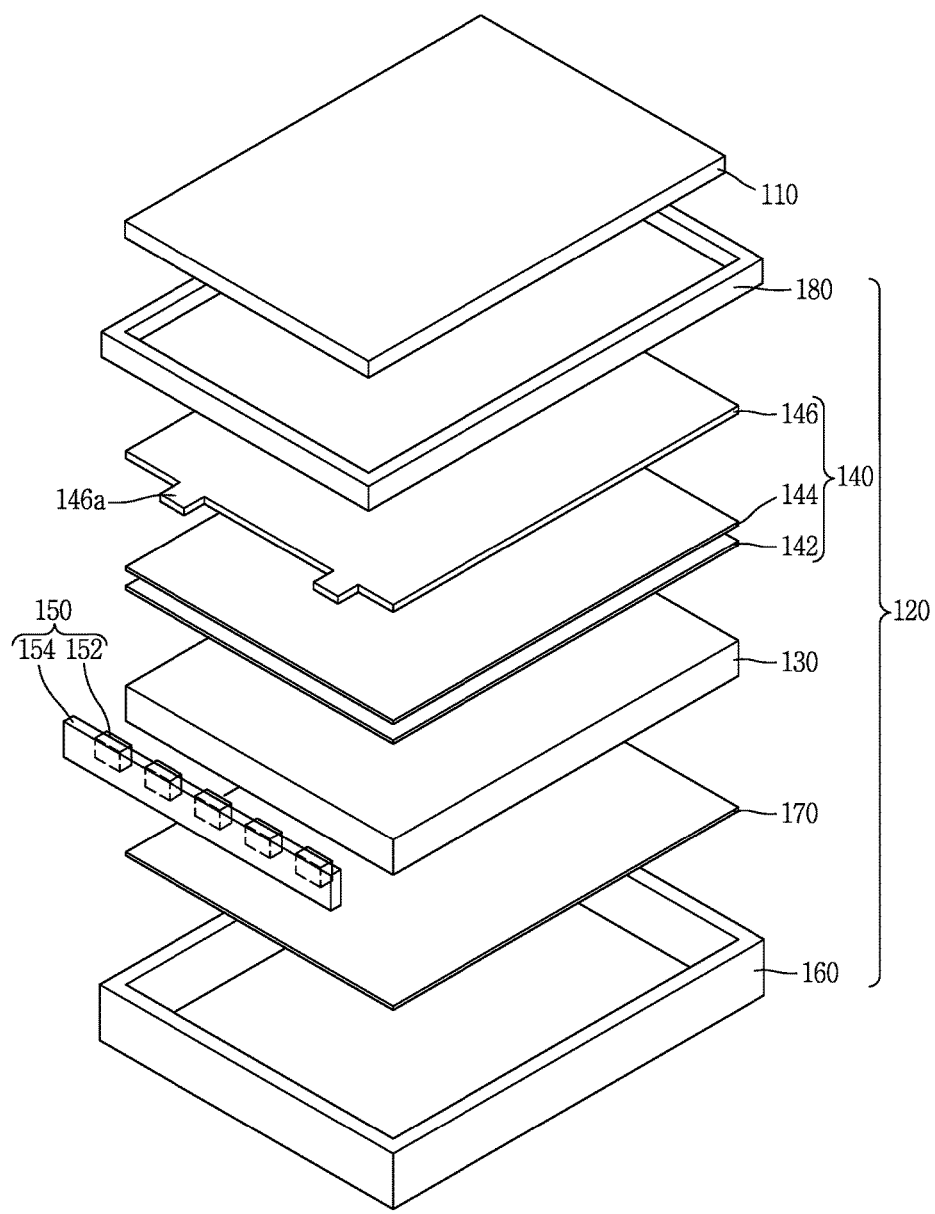
FIG. 6 is an exploded perspective view of a liquid crystal display device according to a first exemplary embodiment of the present invention.

FIG. 6 is an exploded perspective view of a liquid crystal display device according to a first exemplary embodiment of the present invention.

Figure 7:
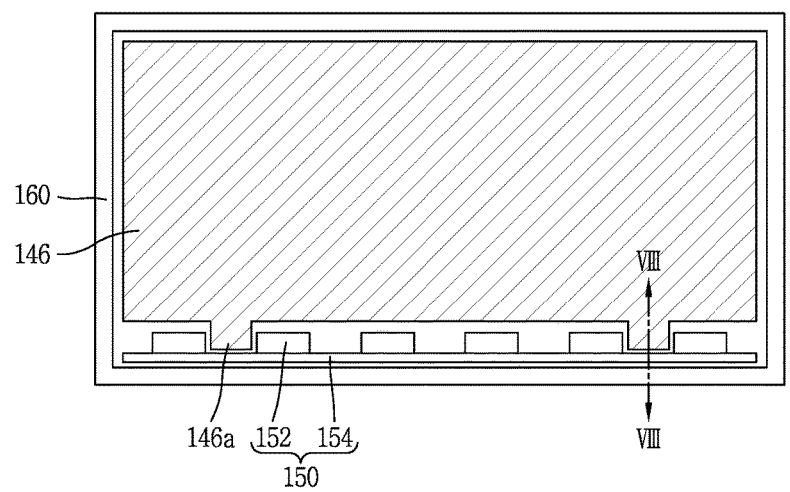
FIG. 7 is a top plan view of the liquid crystal display device according to the first exemplary embodiment of the present invention, which shows a top sheet disposed over a light guide plate.

FIG. 7 is a top plan view of the liquid crystal display device according to the first exemplary embodiment of the present invention, which shows a top sheet disposed over a light guide plate.

Figure 8:
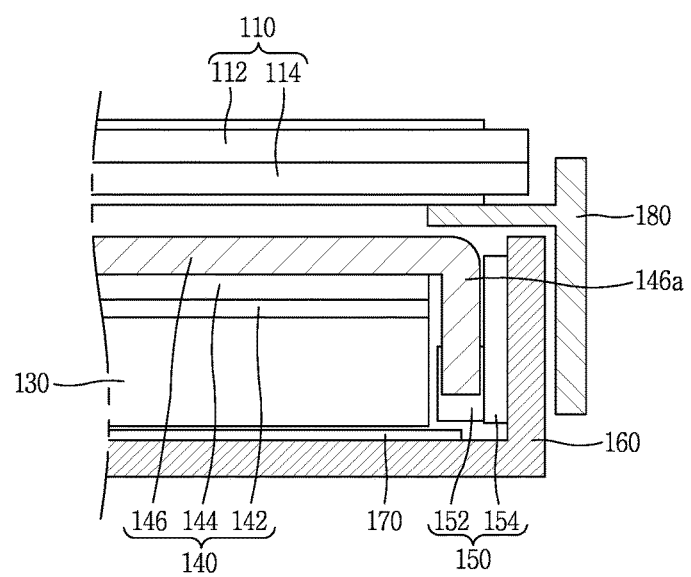
FIG. 8 is a combined cross-sectional view of the liquid crystal display device taken along the line VIII-VIII of FIG. 7.

FIG. 8 is a combined cross-sectional view of the liquid crystal display device taken along the line VIII-VIII of FIG. 7.

Figure 9:
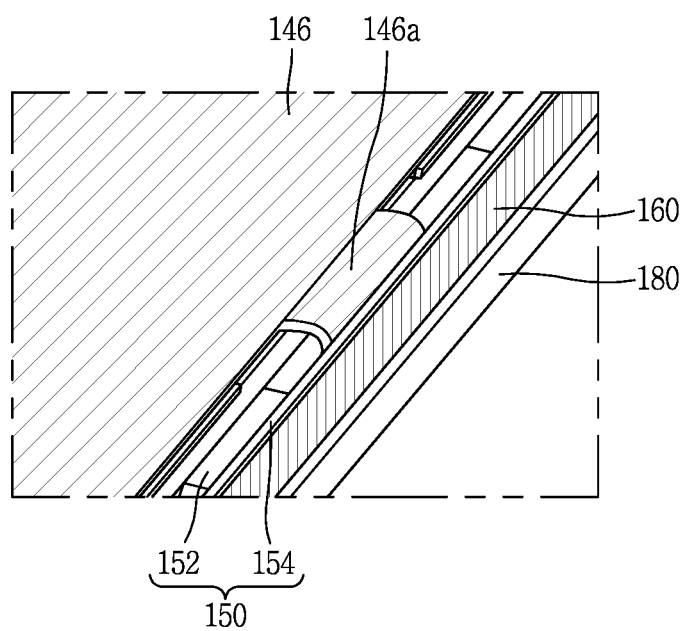
FIG. 9 is a partial enlarged perspective view of the liquid crystal display device according to the first exemplary embodiment of the present invention, which schematically shows a foot of the top sheet half-fixed between light emitting elements.

FIG. 9 is a partial enlarged perspective view of the liquid crystal display device according to the first exemplary embodiment of the present invention, which schematically shows a foot of the top sheet on the top layer half-fixed between light emitting elements.

Referring to FIGS. 6 to 9, the liquid crystal display device according to the first exemplary embodiment of the present invention includes a liquid crystal panel 110 and a backlight unit 120 that provides light to the liquid crystal panel 110.

The liquid crystal panel 110 includes a color filter (CF) substrate 112 and a thin film transistor (TFT) substrate 114 provided under the color filter substrate 112. An integrated circuit chip (IC) and a flexible printed circuit (FPC) are mounted on one side of the liquid crystal panel 110.

A common electrode made of a transparent conductor such as indium tin oxide (ITO) or indium zinc oxide (IZO) may be formed on one surface of the color filter substrate 112. In this case, the common electrode may be formed on the thin film transistor substrate 114 depending on the liquid crystal driving scheme.

A matrix of thin film transistors is formed on the thin film transistor substrate 114, and source and gate terminals of the TFTs are connected to data lines and gate lines, respectively, and pixel electrodes are attached to drain terminals.

The integrated circuit chip IC is mounted on one side of the thin film transistor substrate 114, and generates a data driving signal and a gate driving signal, which are signals for driving the liquid crystal panel 110, and a plurality of timing signals to apply the data and gate driving signals at an appropriate timing, and applies the gate driving signal and the data driving signal to the gate lines and data lines of the liquid crystal panel 110.

The flexible printed circuit FPC, whose one end is connected to one side of the thin film transistor substrate 114, converts an analog signal externally input into the flexible printed circuit FPC to a digital signal and supplies it to the integrated circuit chip IC.

Meanwhile, the backlight unit 120 is disposed under the liquid crystal panel 110, and provides light to the liquid crystal panel 110.

The backlight unit 120 includes a bottom cover 160, a light source, such as light source array 150 disposed on one side of the interior of the bottom cover 160, a light guide plate 130 disposed adjacent to the light source array, a group of optical sheets disposed over the light guide plate 130, a reflective sheet 170 disposed under the light guide plate 130, and a guide panel 180 that protects the bottom cover 160.

The light source array 150 generates light, and includes a plurality of light emitting elements 152 and an array substrate 154 with the light emitting elements 152 mounted on it. In this case, the light emitting elements 152 may be R, G, and B light emitting diodes that emit monochromatic light of R (red), G (green), and B (blue) or light emitting diodes that emit white light, and side mounted-type elements may be used as the light emitting elements 152.

In the case of light emitting elements 152 that emit monochromatic light, monochromatic light emitting elements 152 of R, G, and B may be alternately disposed at regular intervals, and monochromatic lights emitted from them may be mixed together to produce and supply white light to the liquid crystal panel 110. By contrast, in the case of light emitting elements 152 that emit white light, the light emitting elements 152 may be disposed at regular intervals and supply white light to the liquid crystal panel 110.

For example, a white light emitting element may be composed of a blue light emitting element and a fluorescent body that absorbs monochromatic blue light and emits yellow light, and the monochromatic blue light coming from the blue light emitting element and the monochromatic yellow light emitted from the fluorescent body may be mixed together to produce and supply white light to the liquid crystal panel 110.

The array substrate 154 is a flexible circuit substrate with high bendability, and may have a circuit formed within it.

Due to this, external power may be supplied to the light emitting elements 152 through the circuit.

Although the figures illustrate that the light source array, as a side mounted-type backlight unit, is disposed on one side of the light guide plate 130, the present invention is not limited to this and the light source array may be disposed on the other sides of the light guide plate 130 as well and applicable to a direct-type backlight unit as well.

While, in the above, light emitting elements are used as light sources, the present invention is not limited to this and a variety of light sources for producing light, such as cold cathode fluorescent lamps, may be used.

The light guide plate (LGP) 130 guides light coming out of the light source array to the liquid crystal panel 110. Light incident on one side of the light guide plate 130 is repeatedly refracted and reflected by a diffusing agent added to the inside of the light guide plate 130, reaches as far as the other side, and is then delivered to the top of the light guide plate 130. That is, the light guide plate 130 serves to transform a light with a point or linear light source-type optical distribution into a light with a surface light source-type optical distribution.

The reflective sheet 170 is disposed under the light guide plate 130, and serves to reflect light coming down from the light guide plate 130 towards the light guide panel 110. The reflective sheet 170 may deliver uniform luminance distribution across the entire light exit plane by adjusting the total amount of reflection of incident light.

As shown in FIG. 8, the group of optical sheets 140 consists of a bottom sheet 142 for diffusing light coming from the light guide plate 130, a plurality of intermediate sheets 144 for collecting the light diffused by the bottom sheet 142 and supplying it uniformly across the entire area of the liquid crystal panel 110, and a top sheet, i.e., a reflective polarizer 146.

Typically, one bottom sheet 142 is provided, whereas the intermediate sheets 144 may include first and second prism sheets that have prisms intersecting at a right angle to the X and Y axes. The first and second prism sheets may enhance the rectilinearity of light by refracting light in the X and Y axis directions.

Also, a pattern may be formed on one surface of the intermediate sheets 144 in order to distribute light with more uniform luminance. The pattern may have various shapes such as a mountain, a hemisphere, a polygon, etc.

Figure 10A:
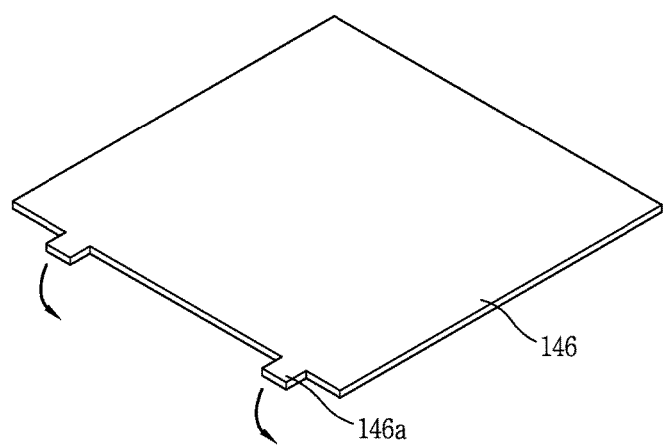
FIG. 10A is a perspective view of the top sheet in the group of optical sheets of the liquid crystal display device according to the first exemplary embodiment of the present invention before bending feet of the top sheet.
Figure 10B:
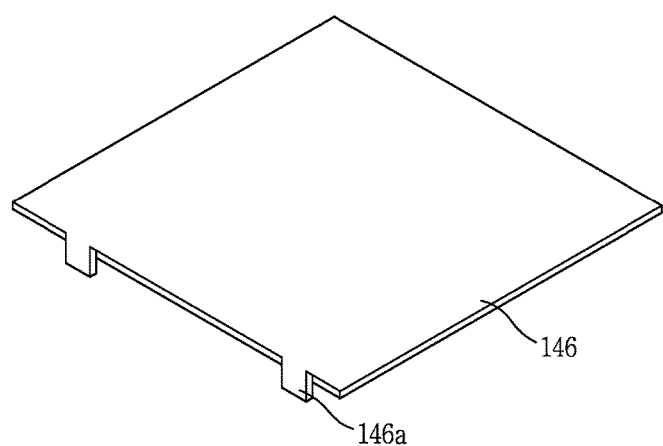
FIG. 10B is a perspective view of the top sheet in the group of optical sheets of the liquid crystal display device according to the first exemplary embodiment of the present invention after bending feet of the top sheet.

FIG. 10A is a perspective view of the top sheet in the group of optical sheets of the liquid crystal display device according to the first exemplary embodiment of the present invention before bending feet of the top sheet. FIG. 10B is a perspective view of the top sheet in the group of optical sheets of the liquid crystal display device according to the first exemplary embodiment of the present invention after bending feet of the top sheet.

As shown in FIG. 10A, at least one foot 146a extends from one edge of the top sheet 146.

As shown in FIG. 10B, the at least one foot 146a on one edge of the top sheet 146 is disposed in a bent position between the light guide plate 130 and the light source array 150.

As shown in FIGS. 7 to 9, the foot 146a of the top sheet 146 in the group of optical sheets 140 is positioned between light emitting elements 152 in the horizontal direction and held between the light guide plate 130 and the bottom cover 160 in the vertical direction from the perspective of an upright display orientation. Notably, the top sheet 146 is half-fixed in the horizontal and vertical directions so as to minimize the movement of the sheets.

In this case, one edge of the top sheet 146 is half-fixed by the foot 146a when assembling the backlight unit, and the other edges of the top sheet 146 where no foot 146a is provided are kept at an assembly gap from other components, for example, the bottom cover, to prevent wrinkles in the sheet.

Figure 2:
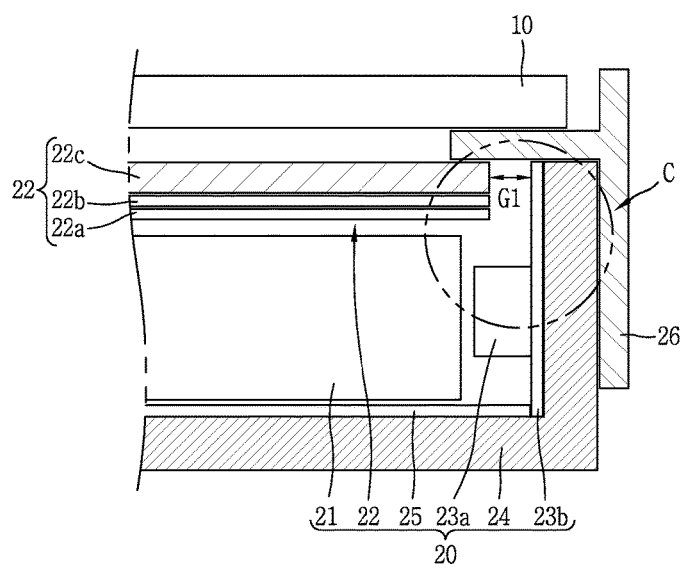
FIG. 2 is a cross-sectional view taken along the line II-II of FIG. 1, which shows a cross-section of the liquid crystal display device according to the related art.
Figure 3:
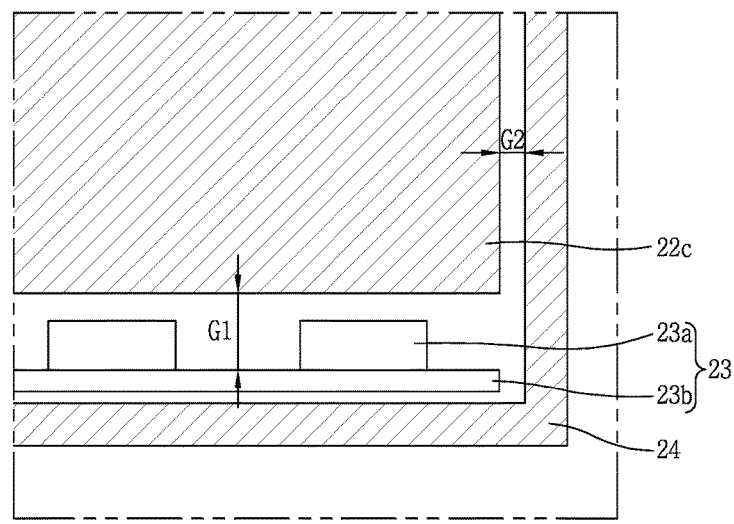
FIG. 3 is an enlarged top plan view of the portion A of FIG. 1, which schematically shows a gap G1 between a light source array and a light guide plate and a vertical gap G2 between a bottom cover and the light guide plate.
Figure 4:
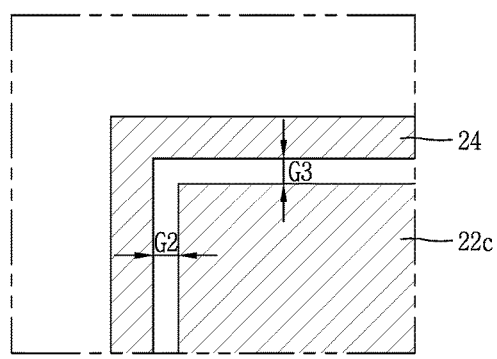
FIG. 4 is an enlarged top plan view of the portion B of FIG. 1, which schematically shows a horizontal gap G3 between the bottom cover and the light guide plate.
Figure 5:
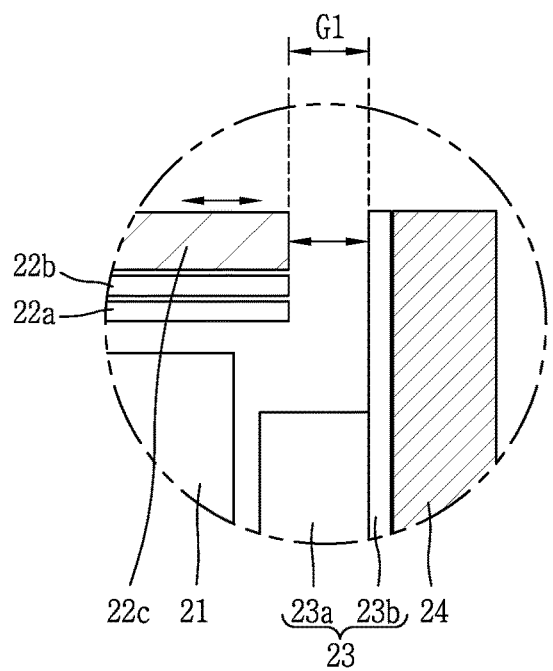
FIG. 5 is an enlarged cross-sectional view of the portion C of FIG. 2, which schematically shows the gap G1 between the light source array and the light guide plate.

Accordingly, since the top sheet 146 is half-fixed between the light guide plate 130 and the light source array 150, with the foot 146a in the bent position, the foot 146a fills a gap between the light guide plate 130 and the light source array, for example, the gap G1 of FIG. 2, thereby minimizing the lateral movement of the group of optical sheets 140.

Now, a liquid crystal display device according to a second exemplary embodiment of the present invention will be described below with reference to the accompanying drawings.

Figure 11:
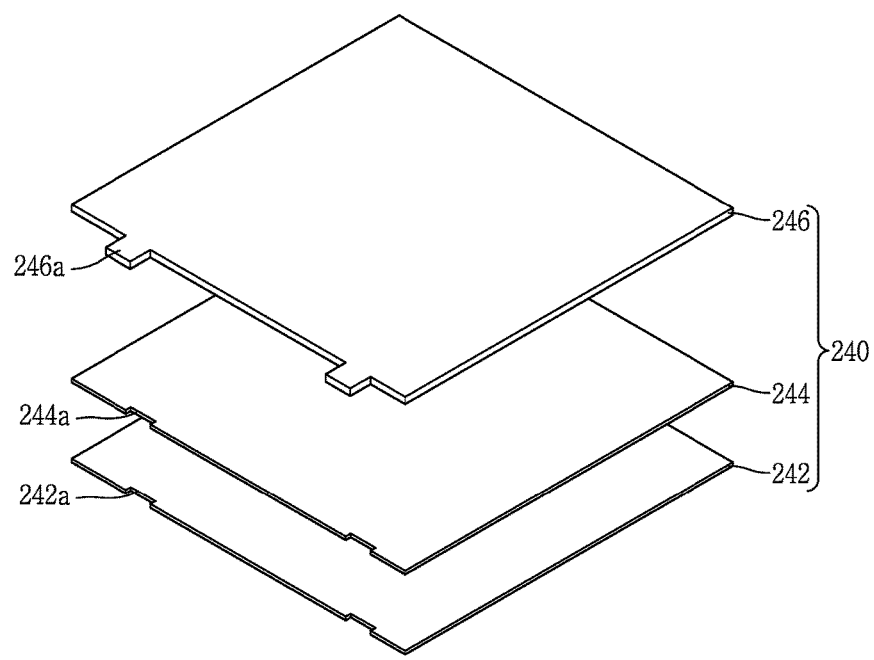
FIG. 11 is a perspective view of top, intermediate, and bottom sheets in a group of optical sheets of a liquid crystal display device according to a second exemplary embodiment of the present invention.

FIG. 11 is a perspective view of a top sheet, intermediate sheets, and bottom sheet in a group of optical sheets of a liquid crystal display device according to a second exemplary embodiment of the present invention.

As shown in FIG. 11, the group of optical sheets 240 used for the liquid crystal display device according to the second exemplary embodiment of the present invention consists of a bottom sheet 242 for diffusing light coming from the light guide plate (see 130 of FIG. 6), a plurality of intermediate sheets 244 for collecting the light diffused by the bottom sheet 242 and supplying it uniformly across the entire area of the liquid crystal panel (see 110 of FIG. 6), and a top sheet, i.e., a reflective polarizer 246.

At least one guide slot 242a is formed on one edge of the bottom sheet 242. Typically, one bottom sheet 242 is provided, whereas the intermediate sheets 244 may include first and second prism sheets that have prisms intersecting at a right angle to the X and Y axes. The first and second prism sheets may enhance the rectilinearity of light by refracting light in the X and Y axis directions.

Also, second guide slots 244a are formed on one edge of the intermediate sheets 244, corresponding to the first guide slots 242a. A pattern may be formed on one surface of the intermediate sheets 244 in order to distribute light with more uniform luminance. The pattern may have various shapes such as a mountain, a hemisphere, a polygon, etc.

Figure 12:
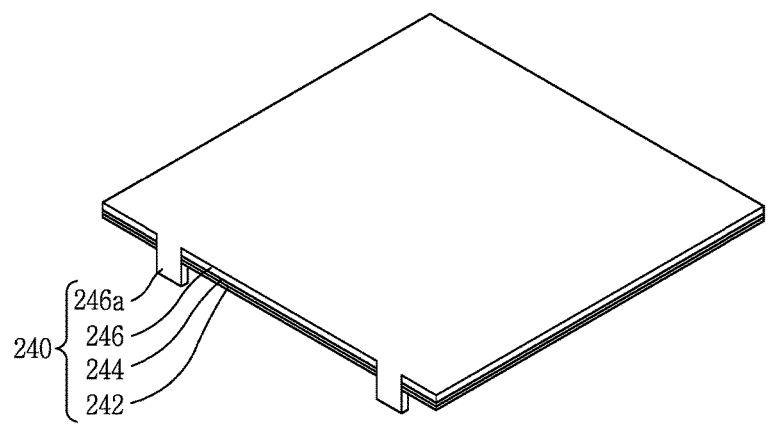
FIG. 12 is a combined perspective view of the top, intermediate, and bottom sheets in the group of optical sheets of the liquid crystal display device according to the second exemplary embodiment of the present invention.

FIG. 12 is a combined perspective view of the top, intermediate, and bottom sheets in the group of optical sheets of the liquid crystal display device according to the second exemplary embodiment of the present invention.

As shown in FIG. 12, at least one foot 246a extends from one edge of the top sheet 246. In this case, the foot 246a is vertically inserted, from the perspective of the liquid crystal display device laying horizontally, and disposed in a bent position in the first and second guide slots 242a and 244a on one edge of the bottom sheet 242 and intermediate sheets 244.

The foot 246a of the top sheet 246 in the group of optical sheets 240 is positioned between light emitting elements (see 152 of FIG. 7) arranged in the horizontal direction, with the liquid crystal display device in an upright display position, and between the light guide plate (see 130 of FIG. 8) and the bottom cover (see 160 of FIG. 8) in the vertical direction, with the liquid crystal display device in an upright display position. Notably, the top sheet 246 is half-fixed in the horizontal and vertical directions so as to minimize the movement of the sheets.

In this case, one edge of the top sheet 246 is half-fixed by the foot 246a when assembling the backlight unit, and the other edges of the top sheet 246 where no foot 246a is provided are kept at an assembly gap from other components, for example, the bottom cover, to prevent wrinkles in the sheet.

Accordingly, since the top sheet 246 is half-fixed between the light guide plate and the light source array, with the foot 246a in the bent position, the foot 246a fills a gap between the light guide plate and the light source array, for example, the gap G1 of FIG. 2, thereby minimizing the lateral movement of the group of optical sheets 240.

Now, a liquid crystal display device according to a third exemplary embodiment of the present invention will be described below with reference to the accompanying drawings.

Figure 13:
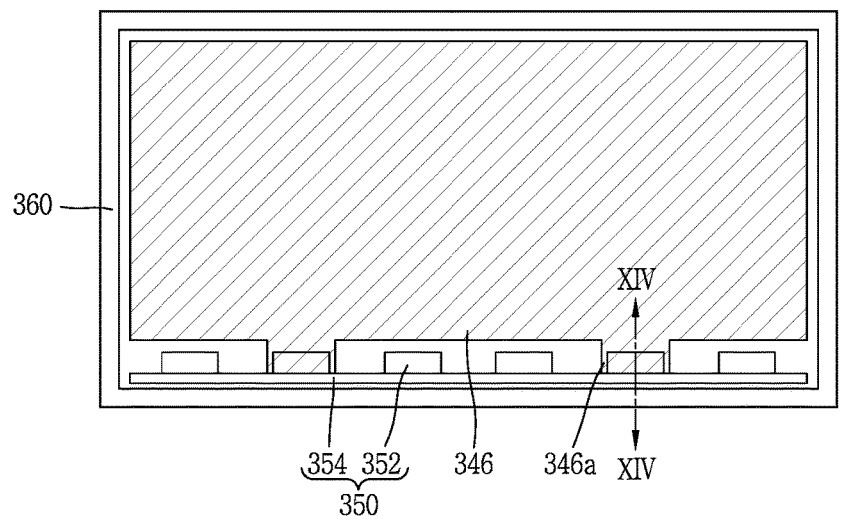
FIG. 13 is a top plan view of a backlight unit using a top sheet in a liquid crystal display device according to a third exemplary embodiment of the present invention.

FIG. 13 is a top plan view of a backlight unit using a top sheet in a liquid crystal display device according to a third exemplary embodiment of the present invention.

Figure 14:
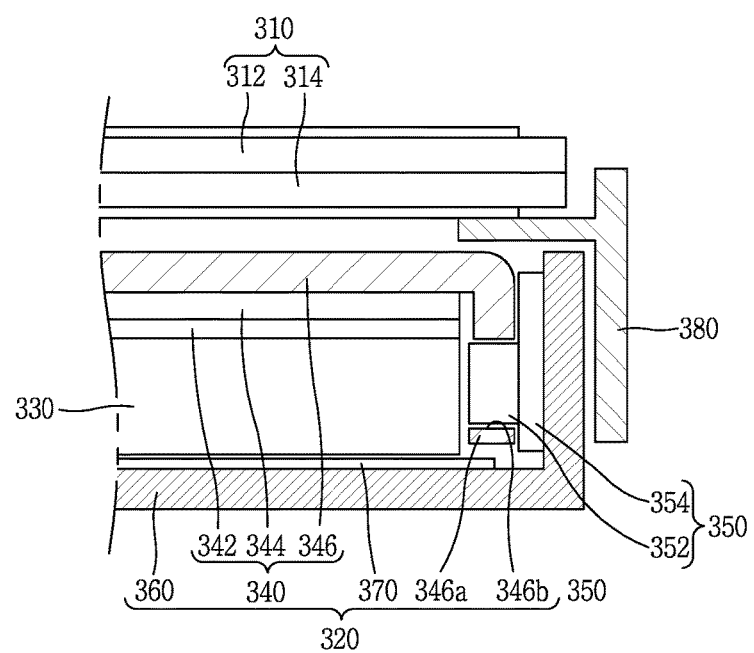
FIG. 14 is a combined cross-sectional view of the liquid crystal display device taken along the line XIV-XIV of FIG. 13.

FIG. 14 is a combined cross-sectional view of the liquid crystal display device taken along the line XIV-XIV of FIG. 13.

Figure 15:
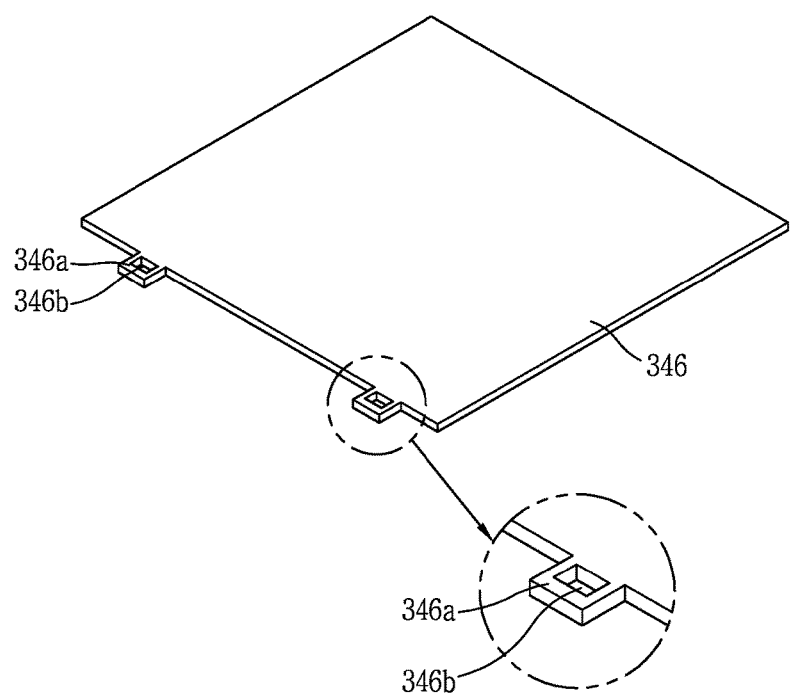
FIG. 15 is a perspective view of the top sheet in the liquid crystal display device according to the third exemplary embodiment of the present invention.

FIG. 15 is a perspective view of the top sheet in the liquid crystal display device according to the third exemplary embodiment of the present invention.

Referring to FIGS. 13 to 14, the liquid crystal display device according to the third exemplary embodiment of the present invention includes a liquid crystal panel 310 and a backlight unit 320 that provides light to the liquid crystal panel 310.

The liquid crystal panel 310 includes a color filter (CF) substrate 312 and a thin film transistor (TFT) substrate 314 provided under the color filter substrate 312. An integrated circuit chip (IC) and a flexible printed circuit (FPC) are mounted on one side of the liquid crystal panel 310.

A common electrode made of a transparent conductor such as indium tin oxide (ITO) or indium zinc oxide (IZO) may be formed on one surface of the color filter substrate 312. In this case, the common electrode may be formed on the thin film transistor substrate 314 depending on the liquid crystal driving scheme.

A matrix of thin film transistors is formed on the thin film transistor substrate 314, and source and gate terminals of the TFTs are connected to data lines and gate lines, respectively, and pixel electrodes are attached to drain terminals.

The integrated circuit chip IC is mounted on one side of the thin film transistor substrate 314, and generates a data driving signal and a gate driving signal, which are signals for driving the liquid crystal panel 310, and a plurality of timing signals to apply the data and gate driving signals at an appropriate timing, and applies the gate driving signal and the data driving signal to the gate lines and data lines of the liquid crystal panel 310.

The flexible printed circuit FPC, whose one end is connected to one side of the thin film transistor substrate 314, converts an analog signal externally input into the flexible printed circuit FPC to a digital signal and supplies it to the integrated circuit chip IC.

Meanwhile, the backlight unit 320 is disposed under the liquid crystal panel 310, and provides light to the liquid crystal panel 310.

The backlight unit 320 includes a bottom cover 360, a light source array 350 disposed on one side of the interior of the bottom cover 360, a light guide plate 330 disposed adjacent to the light source array 350, a group of optical sheets 340 disposed over the light guide plate 330, a reflective sheet 370 disposed under the light guide plate 330, and a guide panel 380 that protects the bottom cover 360.

The light source array 350 generates light, and includes a plurality of light emitting elements 352 and an array substrate 354 with the light emitting elements 352 mounted on it. In this case, the light emitting elements 352 may be R, G, and B light emitting diodes that emit monochromatic light of R (red), G (green), and B (blue) or light emitting diodes that emit white light, and side view-type elements may be used as the light emitting elements 352.

In the case of light emitting elements 352 that emit monochromatic light, monochromatic light emitting elements 352 of R, G, and B may be alternately disposed at regular intervals, and monochromatic lights emitted from them may be mixed together to produce and supply white light to the liquid crystal panel 310. By contrast, in the case of light emitting elements 352 that emit white light, the light emitting elements 352 may be disposed at regular intervals and supply white light to the liquid crystal panel 310.

For example, a white light emitting element may be composed of a blue light emitting element and a fluorescent body that absorbs monochromatic blue light and emits yellow light, and the monochromatic blue light coming from the blue light emitting element and the monochromatic yellow light emitted from the fluorescent body may be mixed together to produce and supply white light to the liquid crystal panel 310.

The array substrate 354 is a flexible circuit substrate with high bendability, and may have a circuit formed within it. Due to this, external power may be supplied to the light emitting element 352 through the circuit.

Although the figures illustrate that the light source array, as a side view-type backlight unit, is disposed on one side of the light guide plate 330, the present invention is not limited to this and the light source array may be disposed on the other sides of the light guide plate 330 as well and applicable to a direct-type backlight unit as well.

While, in the above, light emitting elements are used as light sources, the present invention is not limited to this and a variety of light sources for producing light, such as cold cathode fluorescent lamps, may be used.

The light guide plate (LGP) 330 guides light coming out of the light source array to the liquid crystal panel 310. Light incident on one side of the light guide plate 330 is repeatedly refracted and reflected by a diffusing agent added to the inside of the light guide plate 330, reaches as far as the other side, and is then delivered to the top of the light guide plate 330. That is, the light guide plate 330 serves to transform a light with a point or linear light source-type optical distribution into a light with a surface light source-type optical distribution.

The reflective sheet 370 is disposed under the light guide plate 330, and serves to reflect light coming down from the light guide plate 330 towards the light guide panel 310. The reflective sheet 370 may deliver uniform luminance distribution across the entire light exit plane by adjusting the total amount of reflection of incident light.

As shown in FIG. 14, the group of optical sheets 340 consists of a bottom sheet 342 for diffusing light coming from the light guide plate 330, a plurality of intermediate sheets 344 for collecting the light diffused by the bottom sheet 342 and supplying it uniformly across the entire area of the liquid crystal panel 310, and a top sheet, i.e., a reflective polarizer 346.

Typically, one bottom sheet 342 is provided, whereas the intermediate sheets 344 may include first and second prism sheets that have prisms intersecting at a right angle to the X and Y axes. The first and second prism sheets may enhance the rectilinearity of light by refracting light in the X and Y axis directions.

Also, a pattern may be formed on one surface of the intermediate sheets 344 in order to distribute light with more uniform luminance. The pattern may have various shapes such as a mountain, a hemisphere, a polygon, etc.

As shown in FIG. 15, at least one foot 346a extends from one edge of the top sheet 346. In this case, the foot 346a has a light emitting element insertion hole 346b through which a light emitting element 352 is inserted and exposed. Accordingly, the top sheet 346 is half-fixed between the light source array 350 and the light guide plate 330 since the foot 346a is fitted to the light emitting element 352 and held in place.

As shown in FIG. 14, the foot 346a of the top sheet 346 in the group of optical sheets 340 is positioned at a light emitting element 352 in the horizontal direction and between the light guide plate 330 and the bottom cover 360 in the vertical direction, with the liquid crystal display device in an upright display position. Notably, the at least one foot 346a on one edge of the top sheet 346 is disposed in a bent position between the light guide plate 330 and the light source array 350, and the light emitting element 352 is fitted into the light emitting element insertion hole 346b formed in the foot 346a.

In this case, one edge of the top sheet 346 is half-fixed by the foot 346a when assembling the backlight unit, and the other edges of the top sheet 346 where no foot 346a is provided are kept at an assembly gap from other components, for example, the bottom cover, to prevent wrinkles in the sheet.

Accordingly, the foot 346a of the top sheet 346 fills a gap between the light guide plate 330 and the light source array 350, for example, the gap G1 of FIG. 2, thereby minimizing the lateral movement of the group of optical sheets 340.

Now, a liquid crystal display device according to a fourth exemplary embodiment of the present invention will be described below with reference to the accompanying drawings.

Figure 16:
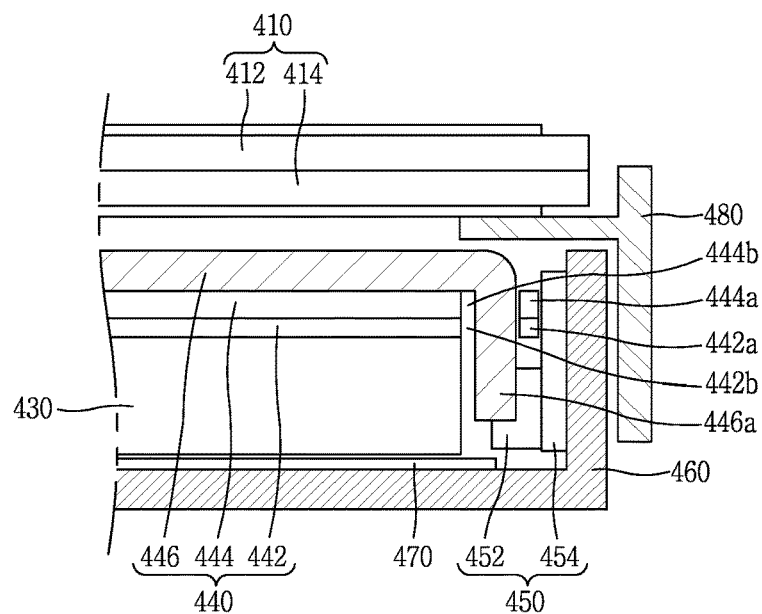
FIG. 16 is a combined cross-sectional view of a liquid crystal display device according to a fourth exemplary embodiment of the present invention.

FIG. 16 is a combined cross-sectional view of a liquid crystal display device according to a fourth exemplary embodiment of the present invention.

Figure 17:
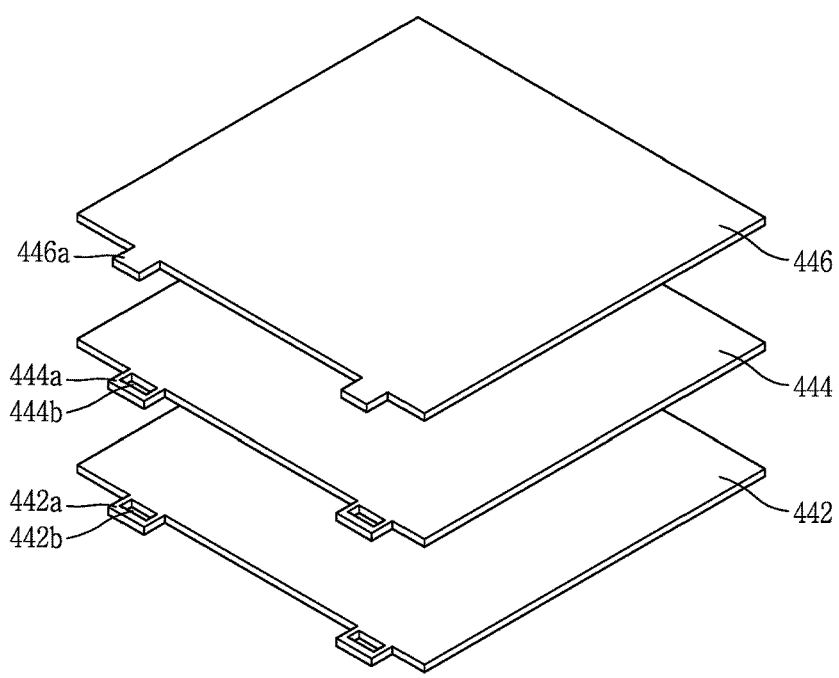
FIG. 17 is an exploded perspective view of a group of optical sheets in the liquid crystal display device according to the fourth exemplary embodiment of the present invention.

FIG. 17 is an exploded perspective view of a group of optical sheets in the liquid crystal display device according to the fourth exemplary embodiment of the present invention.

Referring to FIG. 16, the liquid crystal display device according to the fourth exemplary embodiment of the present invention includes a liquid crystal panel 410 and a backlight unit 420 that provides light to the liquid crystal panel 410.

The liquid crystal panel 410 includes a color filter (CF) substrate 412 and a thin film transistor (TFT) substrate 414 provided under the color filter substrate 412. An integrated circuit chip (IC) and a flexible printed circuit (FPC) are mounted on one side of the liquid crystal panel 410.

Although not shown, a common electrode made of a transparent conductor such as indium tin oxide (ITO) or indium zinc oxide (IZO) may be formed on one surface of the color filter substrate 412. In this case, the common electrode may be formed on the thin film transistor substrate 414 depending on the liquid crystal driving scheme.

A matrix of thin film transistors is formed on the thin film transistor substrate 414, and source and gate terminals of the TFTs are connected to data lines and gate lines, respectively, and pixel electrodes are attached to drain terminals.

The integrated circuit chip IC is mounted on one side of the thin film transistor substrate 414, and generates a data driving signal and a gate driving signal, which are signals for driving the liquid crystal panel 410, and a plurality of timing signals to apply the data and gate driving signals at an appropriate timing, and applies the gate driving signal and the data driving signal to the gate lines and data lines of the liquid crystal panel 410.

The flexible printed circuit FPC, whose one end is connected to one side of the thin film transistor substrate 414, converts an analog signal externally input into the flexible printed circuit FPC to a digital signal and supplies it to the integrated circuit chip IC.

Meanwhile, the backlight unit 420 is disposed under the liquid crystal panel 410, and provides light to the liquid crystal panel 410.

The backlight unit 420 includes a bottom cover 460, a light source array 450 disposed on one side of the interior of the bottom cover 460, a light guide plate 430 disposed adjacent to the light source array 450, a group of optical sheets 440 disposed over the light guide plate 430, a reflective sheet 470 disposed under the light guide plate 430, and a guide panel 480 that protects the bottom cover 460.

The light source array 450 generates light, and includes a plurality of light emitting elements 452 and an array substrate 454 with the light emitting elements 452 mounted on it. In this case, the light emitting elements 452 may be R, G, and B light emitting diodes that emit monochromatic light of R (red), G (green), and B (blue) or light emitting diodes that emit white light, and side view-type elements may be used as the light emitting elements 452.

In the case of light emitting elements 452 that emit monochromatic light, monochromatic light emitting elements 452 of R, G, and B may be alternately disposed at regular intervals, and monochromatic lights emitted from them may be mixed together to produce and supply white light to the liquid crystal panel 410. By contrast, in the case of light emitting elements 452 that emit white light, the light emitting elements 452 may be disposed at regular intervals and supply white light to the liquid crystal panel 410.

For example, a white light emitting element may be composed of a blue light emitting element and a fluorescent body that absorbs monochromatic blue light and emits yellow light, and the monochromatic blue light coming from the blue light emitting element and the monochromatic yellow light emitted from the fluorescent body may be mixed together to produce and supply white light to the liquid crystal panel 410.

The array substrate 454 is a flexible circuit substrate with high bendability, and may have a circuit formed within it. Due to this, external power may be supplied to the light emitting element 452 through the circuit.

Although the figures illustrate that the light source array, as a side view-type backlight unit, is disposed on one side of the light guide plate 430, the present invention is not limited to this and the light source array may be disposed on the other sides of the light guide plate 430 as well and applicable to a direct-type backlight unit as well.

While, in the above, light emitting elements are used as light sources, the present invention is not limited to this and a variety of light sources for producing light, such as cold cathode fluorescent lamps, may be used.

The light guide plate (LGP) 430 guides light coming out of the light source array to the liquid crystal panel 410. Light incident on one side of the light guide plate 430 is repeatedly refracted and reflected by a diffusing agent added to the inside of the light guide plate 430, reaches as far as the other side, and is then delivered to the top of the light guide plate 430. That is, the light guide plate 430 serves to transform a light with a point or linear light source-type optical distribution into a light with a surface light source-type optical distribution.

The reflective sheet 470 is disposed under the light guide plate 430, and serves to reflect light coming down from the light guide plate 430 towards the light guide panel 410. The reflective sheet 470 may deliver uniform luminance distribution across the entire light exit plane by adjusting the total amount of reflection of incident light.

As shown in FIGS. 16 and 17, the group of optical sheets 440 consists of a bottom sheet 442 for diffusing light coming from the light guide plate 430, a plurality of intermediate sheets 444 for collecting the light diffused by the bottom sheet 442 and supplying it uniformly across the entire area of the liquid crystal panel 410, and a top sheet, i.e., a reflective polarizer 446.

At least one first foot rack 442a extends from one edge of the bottom sheet 442, and the first foot rack 442a has a foot insertion hole 442b.

Also, at least one second foot rack 444a extends from one edge of the intermediate sheets 444, corresponding to the first foot rack 442a, and the second foot rack 442a has a foot insertion hole 444b. The intermediate sheets 444 may include first and second prism sheets that have prisms intersecting at a right angle to the X and Y axes. The first and second prism sheets may enhance the rectilinearity of light by refracting light in the X and Y axis directions.

A pattern may be formed on one surface of the intermediate sheets 444 in order to distribute light with more uniform luminance. The pattern may have various shapes such as a mountain, a hemisphere, a polygon, etc.

As shown in FIG. 17, at least one foot 446a extends from one edge of the top sheet 446. In this case, the foot 446a is formed at a position corresponding to the first and second foot racks 442a and 444a of the bottom sheet 442 and intermediate sheets 444.

As shown in FIG. 16, the foot 446a of the top sheet 446 in the group of optical sheets 440 is inserted through the first and second light emitting element insertion holes 442b and 444b of the first and second foot racks 442a and 444a and then positioned between light emitting elements 452 in the horizontal direction and between the light guide plate 430 and the bottom cover 460 in the vertical direction, with the liquid crystal display device in an upright display orientation. Notably, the at least one foot 446a on one edge of the top sheet 446 is disposed and half-fixed in a bent position between the light guide plate 430 and the light source array 450.

In this case, one edge of the top sheet 446 is half-fixed by the foot 446a when assembling the backlight unit, and the other edges of the top sheet 446 that have no foot 446a are kept at an assembly gap from other components, for example, the bottom cover, to prevent wrinkles in the sheet.

Accordingly, the foot 446a of the top sheet 446 in the group of optical sheets 440 is placed between the light guide plate 430 and the light source array 450 and fills a gap between the light guide plate 430 and the light source array 450, for example, the gap G1 of FIG. 2, thereby minimizing the lateral movement of the group of optical sheets 440.

Now, a liquid crystal display device according to a fifth exemplary embodiment of the present invention will be described below with reference to the accompanying drawings.

Figure 18:
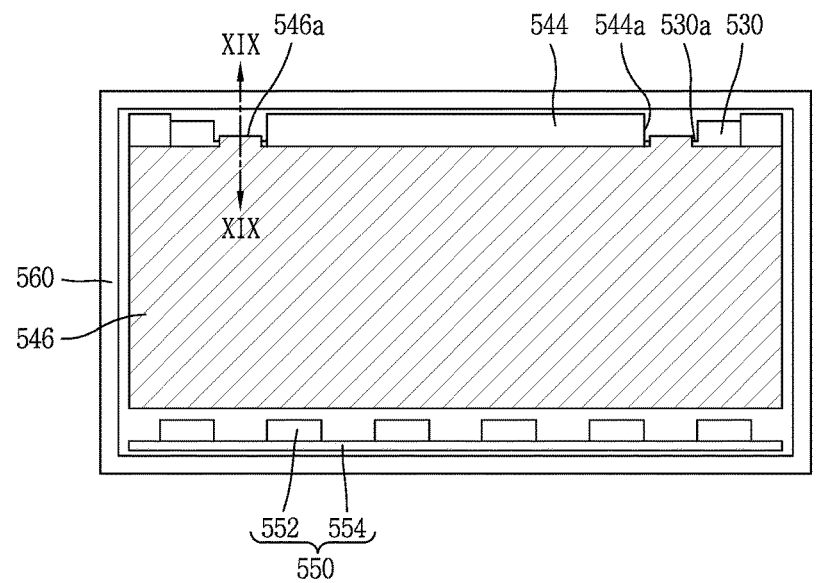
FIG. 18 is a top plan view of a backlight unit using a group of optical sheets in a liquid crystal display device according to a fifth exemplary embodiment of the present invention.

FIG. 18 is a top plan view of a backlight unit using a group of optical sheets in a liquid crystal display device according to a fifth exemplary embodiment of the present invention.

Figure 19:
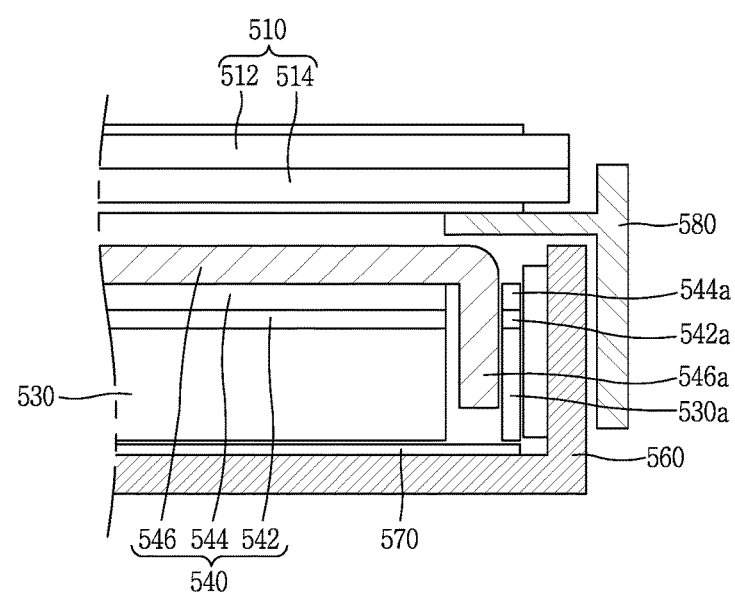
FIG. 19 is a combined cross-sectional view of the liquid crystal display device taken along the line XIX-XIX of FIG. 18.

FIG. 19 is a combined cross-sectional view of the liquid crystal display device taken along the line XIX-XIX of FIG. 18.

Figure 20:
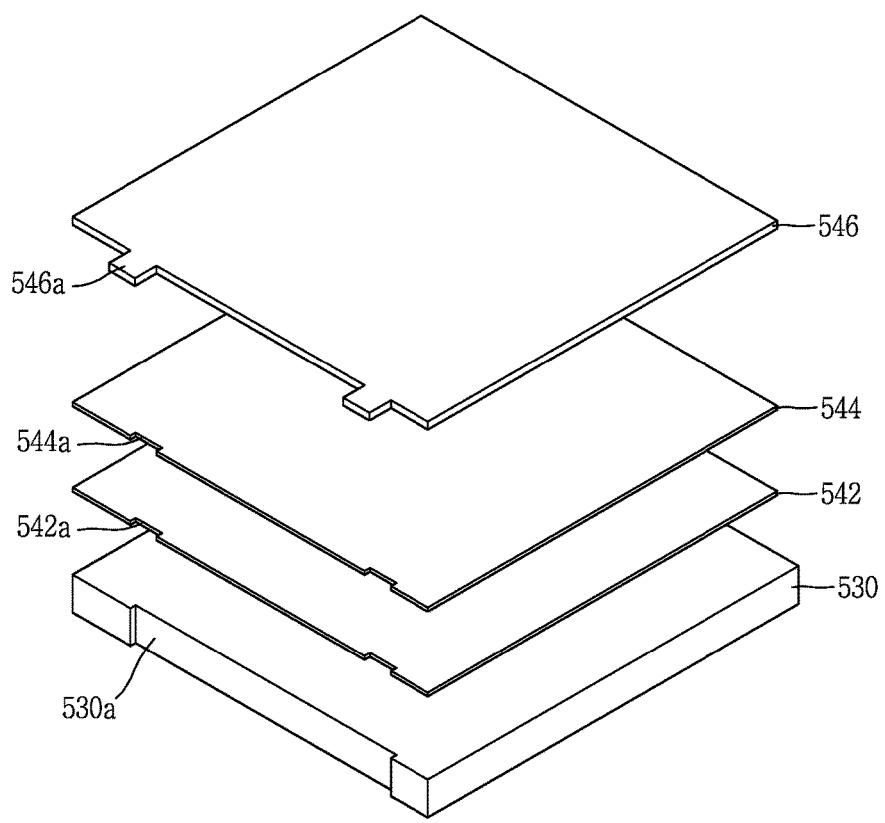
FIG. 20 is a perspective view of the group of optical sheets and light guide plate in the liquid crystal display device according to the fifth exemplary embodiment of the present invention.

FIG. 20 is a perspective view of the group of optical sheets and light guide plate in the liquid crystal display device according to the fifth exemplary embodiment of the present invention.

Referring to FIGS. 18 and 19, the liquid crystal display device according to the fifth exemplary embodiment of the present invention includes a liquid crystal panel 510 and a backlight unit 520 that provides light to the liquid crystal panel 510.

The liquid crystal panel 510 includes a color filter (CF) substrate 512 and a thin film transistor (TFT) substrate 514 provided under the color filter substrate 512. An integrated circuit chip (IC) and a flexible printed circuit (FPC) are mounted on one side of the liquid crystal panel 510.

A common electrode made of a transparent conductor such as indium tin oxide (ITO) or indium zinc oxide (IZO) may be formed on one surface of the color filter substrate 512. In this case, the common electrode may be formed on the thin film transistor substrate 514 depending on the liquid crystal driving scheme.

A matrix of thin film transistors is formed on the thin film transistor substrate 514, and source and gate terminals of the TFTs are connected to data lines and gate lines, respectively, and pixel electrodes are attached to drain terminals.

The integrated circuit chip IC is mounted on one side of the thin film transistor substrate 514, and generates a data driving signal and a gate driving signal, which are signals for driving the liquid crystal panel 510, and a plurality of timing signals to apply the data and gate driving signals at an appropriate timing, and applies the gate driving signal and the data driving signal to the gate lines and data lines of the liquid crystal panel 510.

The flexible printed circuit FPC, whose one end is connected to one side of the thin film transistor substrate 514, converts an analog signal externally input into the flexible printed circuit FPC to a digital signal and supplies it to the integrated circuit chip IC.

Meanwhile, the backlight unit 520 is disposed under the liquid crystal panel 510, and provides light to the liquid crystal panel 510.

The backlight unit 520 includes a bottom cover 560, a light source array 550 disposed on one side of the interior of the bottom cover 560, a light guide plate 530 disposed adjacent to the light source array 550, a group of optical sheets 540 disposed over the light guide plate 530, a reflective sheet 570 disposed under the light guide plate 530, and a guide panel 580 that protects the bottom cover 560.

The light source array 550 generates light, and includes a plurality of light emitting elements 552 and an array substrate 554 with the light emitting elements 552 mounted on it. In this case, the light emitting elements 552 may be R, G, and B light emitting diodes that emit monochromatic light of R (red), G (green), and B (blue) or light emitting diodes that emit white light, and side view-type elements may be used as the light emitting elements 552.

In the case of light emitting elements 552 that emit monochromatic light, monochromatic light emitting elements 552 of R, G, and B may be alternately disposed at regular intervals, and monochromatic lights emitted from them may be mixed together to produce and supply white light to the liquid crystal panel 510. By contrast, in the case of light emitting elements 552 that emit white light, the light emitting elements 552 may be disposed at regular intervals and supply white light to the liquid crystal panel 510.

For example, a white light emitting element may be composed of a blue light emitting element and a fluorescent body that absorbs monochromatic blue light and emits yellow light, and the monochromatic blue light coming from the blue light emitting element and the monochromatic yellow light emitted from the fluorescent body may be mixed together to produce and supply white light to the liquid crystal panel 510.

The array substrate 554 is a flexible circuit substrate with high bendability, and may have a circuit formed within it. Due to this, external power may be supplied to the light emitting element 552 through the circuit.

Although the figures illustrate that the light source array, as a side mounted-type backlight unit, is disposed on one side of the light guide plate 530, the present invention is not limited to this. As shown in FIG. 18, the light source array may be disposed on the other side of the light guide plate 530, opposite of the side that includes the at least one foot 346a. The present invention is also applicable to a direct-type backlight unit as well.

While, in the above, light emitting elements are used as light sources, the present invention is not limited to this and a variety of light sources for producing light, such as cold cathode fluorescent lamps, may be used.

The light guide plate (LGP) 530 guides light coming out of the light source array to the liquid crystal panel 510. Light incident on one side of the light guide plate 530 is repeatedly refracted and reflected by a diffusing agent added to the inside of the light guide plate 530, reaches as far as the other side, and is then delivered to the top of the light guide plate 530. That is, the light guide plate 530 serves to transform a light with a point or linear light source-type optical distribution into a light with a surface light source-type optical distribution.

The reflective sheet 570 is disposed under the light guide plate 530, and serves to reflect light coming down from the light guide plate 530 towards the light guide panel 510. The reflective sheet 570 may deliver uniform luminance distribution across the entire light exit plane by adjusting the total amount of reflection of incident light.

As shown in FIGS. 19 and 20, the group of optical sheets 540 consists of a bottom sheet 542 for diffusing light coming from the light guide plate 530, a plurality of intermediate sheets 544 for collecting the light diffused by the bottom sheet 542 and supplying it uniformly across the entire area of the liquid crystal panel 510, and a top sheet, i.e., a reflective polarizer 546.

At least one first guide slot 542a is formed on one edge of the bottom sheet 542, opposite to the light source array 550.

Also, at least one second guide slot 544a is formed on one edge of the intermediate sheets 544, corresponding to the first guide slot 542a. The intermediate sheets 544 may include first and second prism sheets that have prisms intersecting at a right angle to the X and Y axes. The first and second prism sheets may enhance the rectilinearity of light by refracting light in the X and Y axis directions. A third guide slot 530a is formed on one edge of the light guide plate. The third guide slot 530a is formed on the side of the light guide plate, opposite the light source array.

A pattern may be formed on one surface of the intermediate sheets 544 in order to distribute light with more uniform luminance. The pattern may have various shapes such as a mountain, a hemisphere, a polygon, etc.

As shown in FIG. 20, at least one foot 546a extends from one edge of the top sheet 546. In this case, the foot 546a is formed at a position corresponding to the first and second guide slots 542a and 544a of the bottom sheet 542 and intermediate sheets 544.

As shown in FIG. 19, the foot 546a of the top sheet 546 in the group of optical sheets 540 is positioned on the side of the light guide plate 530, bent towards the first and second guide slots 542 and 544a. That is, the foot 546a of the top sheet 546 is positioned between the light guide plate 530 and the bottom cover 560. A guide slot 530a may be formed on one edge of the light guide slot to accommodate the foot 546a of the top sheet disposed in the bent position. In this case, one edge of the top sheet 546 is half-fixed by the foot 546a when assembling the backlight unit, and the other edges of the top sheet 546 where no foot 546a is provided are kept at an assembly gap from other components, for example, the light source array, to prevent wrinkles in the sheet.

Accordingly, the foot 546a of the top sheet 546 in the group of optical sheets 540 is disposed between the light guide plate 530 and the bottom cover 560 and fills a gap between them, for example, the gap G1 of FIG. 2, thereby minimizing the lateral movement of the group of optical sheets 540.

As seen from above, a liquid crystal display device according to the present invention can reduce noise from sheets, which may occur when the liquid crystal display device is shaken by hand, by forming a foot on the top sheet, among a plurality of optical sheets disposed over the light guide plate, and half-fixing the foot on the top sheet between light emitting elements and between the light guide plate and the bottom cover.

Moreover, the liquid crystal display device according to the present invention can prevent wrinkles in the sheets by forming a foot on the top sheet, among a plurality of optical sheets disposed over the light guide plate, half-fixing the part of the top sheet where the foot is formed, when assembling a backlight unit, and keeping an assembly gap between the part of the top sheet where no foot is formed and other components.

While several exemplary embodiments have been described with reference to the accompanying drawings, the present invention is not limited to them.

The above description is merely intended to illustratively describe the technical spirit of the present invention, and those skilled in the art to which the present invention pertains, various changes and modifications may be possible without departing from the essential features of the present invention. Therefore, the embodiments disclosed in the present invention are not intended to limit the technical spirit of the present invention and are merely intended to describe the present invention, and the technical spirit of the present invention is not limited by those embodiments of the present invention. The scope of protection of the present invention should be interpreted by the accompanying claims, and all technical spirits in equivalents thereof should be interpreted as being included in the scope of the present invention.

What is claimed is:

1. A liquid crystal display device comprising:
   a liquid crystal panel;
   a light guide plate having an edge side;
   a light source array disposed on the edge side of the light guide plate;
   a group of optical sheets disposed over the light guide plate and having at least one foot; and
   a bottom cover in which the light source array, light guide plate, and the group of optical sheets are contained, wherein the at least one foot extends from one edge of a top sheet, among the group of optical sheets, toward the bottom cover, wherein the at least one foot is bent along one edge side of the light guide plate and the at least one foot is held between the light guide plate and the bottom cover, and wherein a light emitting element insertion hole is formed in the at least one foot so that a light emitting element is fitted to the at least one foot of the top sheet in the group of optical sheets.

2. The liquid crystal display device of claim 1, wherein the at least one foot is disposed between light emitting elements of the light source array.

3. The liquid crystal display device of claim 1, wherein guide slots corresponding to the at least one foot are formed on one edge of intermediate and bottom sheets, among the group of optical sheets, underlying the top sheet.

4. The liquid crystal display device of claim 1, wherein the top sheet is a reflective polarizer, and wherein the at least one foot is formed on one edge of the reflective polarizer.

5. The liquid crystal display device of claim 1, wherein a guide slot is formed on one edge of the light guide plate.

6. The liquid crystal display device of claim 5, wherein the guide slot on the one edge of the light guide plate is formed on the side of the light guide plate, opposite the light source array.

7. The liquid crystal display device of claim 1, further comprising a gap between a part of the top sheet where no foot is formed and the bottom cover.

8. A liquid crystal display device comprising:
a liquid crystal panel;
a group of optical sheets disposed below the liquid crystal panel, and having at least one foot; and
a bottom cover in which the group of optical sheets are contained,
wherein the at least one foot extends from one edge of a top sheet, among the group of optical sheets, toward the bottom cover,
wherein each of intermediate and bottom sheets, among the group of optical sheets, are provided with a foot rack with a foot insertion hole extending outwardly from one edge thereof, so that the at least one foot of the top sheet is bent and inserted through the respective foot insertion holes, and wherein the at least one foot of the top sheet has substantially a same size as the respective foot insertion holes.

9. The liquid crystal display device of claim 8, wherein the top sheet is a reflective polarizer, and wherein the at least one foot is formed on one edge of the reflective polarizer.

10. The liquid crystal display device of claim 8, further comprising a light guide plate disposed below the group of optical sheets,
wherein a guide slot is formed on one edge of the light guide plate.

11. The liquid crystal display device of claim 8, further comprising a gap between a part of the top sheet where no foot is formed and the bottom cover.

12. A liquid crystal display device comprising:
a liquid crystal panel;
a group of optical sheets disposed below the liquid crystal panel and having at least one foot; and
a bottom cover in which the group of optical sheets are contained,
wherein the at least one foot is a portion of a top sheet among the group of optical sheets, and the at least one foot extends from one edge of the top sheet, and
wherein guide slots are formed on one edge of intermediate and bottom sheets, among the group of optical sheets, underlying the top sheet, and has a recessed shape from the one edge of intermediate and bottom sheets to an inside, so that the at least one foot of the top sheet is bent and disposed in the guide slots of the intermediate and bottom sheets.

13. The liquid crystal display device of claim 12, wherein the material of the at least one foot is the same as the material of the top sheet.

14. The liquid crystal display device of claim 12, further comprising a light guide plate disposed below the group of optical sheets,
wherein the at least one foot is held between the light guide plate and the bottom cover.

\* \* \* \* \*